US010095246B2

(12) United States Patent
Yokokawa et al.

(10) Patent No.: US 10,095,246 B2
(45) Date of Patent: Oct. 9, 2018

(54) LEAKAGE SUPPRESSION APPARATUS, LEAKAGE SUPPRESSION SYSTEM, AND LEAKAGE SUPPRESSION PROGRAM

(71) Applicant: KABUSHIKI KAISHA TOSHIBA, Minato-ku (JP)

(72) Inventors: Katsuya Yokokawa, Fuchu (JP); Ryo Namba, Kawasaki (JP); Osamu Yamanaka, Hachioji (JP); Toshiharu Sugino, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 165 days.

(21) Appl. No.: 15/100,812

(22) PCT Filed: Nov. 20, 2014

(86) PCT No.: PCT/JP2014/080752
§ 371 (c)(1),
(2) Date: Jun. 1, 2016

(87) PCT Pub. No.: WO2015/083551
PCT Pub. Date: Jun. 11, 2015

(65) Prior Publication Data
US 2016/0306366 A1    Oct. 20, 2016

(30) Foreign Application Priority Data

Dec. 2, 2013   (JP) ................. 2013-249487

(51) Int. Cl.
*G05D 7/00*        (2006.01)
*G05D 7/06*        (2006.01)
(Continued)

(52) U.S. Cl.
CPC ............ *G05D 7/0676* (2013.01); *F17D 1/08* (2013.01); *F17D 3/00* (2013.01)

(58) Field of Classification Search
CPC ............ G05D 7/0676; F17D 1/08; F17D 3/00
See application file for complete search history.

(56) References Cited

U.S. PATENT DOCUMENTS 4,200,922 A * 4/1980 Hagemann ............... B63G 7/02
                                                                    367/106
4,569,012 A * 2/1986 Sekozawa ............ G05D 7/0617
                                                                    137/10
(Continued)

FOREIGN PATENT DOCUMENTS

AU    2009200516 A1    8/2009
CN    101183249 A      5/2008
(Continued)

OTHER PUBLICATIONS

International Search Report dated Feb. 24, 2015 in PCT/JP2014/080752 filed Nov. 20, 2014.

*Primary Examiner* — Vincent Tran
(74) *Attorney, Agent, or Firm* — Oblon, McClelland, Maier & Neustadt, L.L.P.

(57) ABSTRACT

A pressure estimator, based on information acquired by an acquirer and model information that includes connection information of nodes in a water distribution pipeline network, estimates water pressure at at least one part of the nodes in the water distribution pipeline network. An extractor extracts a minimum water pressure value from a plurality of water pressures that include the water pressure estimated by the pressure estimator. A controller controls an adjustor to adjust at least one of a water pressure and a flow rate of water flowing into the water distribution pipeline network, based on a minimum water pressure value extracted by the extractor.

7 Claims, 9 Drawing Sheets

(51) Int. Cl.
*F17D 1/08* (2006.01)
*F17D 3/00* (2006.01)

(56) References Cited

U.S. PATENT DOCUMENTS

| | | | |
|---|---|---|---|
| 4,712,182 A | 12/1987 | Wakamori et al. | |
| 5,460,196 A * | 10/1995 | Yonnet | G05D 16/2093 137/12 |
| 6,017,193 A * | 1/2000 | Takeuchi | G05D 16/2073 417/20 |
| 2009/0066524 A1 * | 3/2009 | Yukawa | G01M 3/2815 340/605 |
| 2012/0013483 A1 * | 1/2012 | Jung | H04Q 9/00 340/870.16 |
| 2012/0291886 A1 * | 11/2012 | Rivera | E03B 7/071 137/487.5 |
| 2014/0052421 A1 * | 2/2014 | Allen | G05B 17/02 703/2 |
| 2014/0358499 A1 * | 12/2014 | Sambur | G06F 17/5009 703/2 |

FOREIGN PATENT DOCUMENTS

| | | |
|---|---|---|
| CN | 102777770 A | 11/2012 |
| CN | 102865459 A | 1/2013 |
| EP | 2 003 253 A2 | 12/2008 |
| JP | 6-306893 A | 11/1994 |
| JP | 8-95645 A | 4/1996 |
| JP | 2001-5531 A | 1/2001 |
| JP | 2001-280597 A | 10/2001 |
| JP | 2003-64729 A | 3/2003 |
| JP | 2007-270562 A | 10/2007 |
| JP | 2009-192329 A | 8/2009 |
| JP | 4342278 B2 | 10/2009 |

* cited by examiner

FIG. 3

| #NUMBER OF NODES | NUMBER OF PIPES | | | | |
|---|---|---|---|---|---|
| 9 | 11 | | | | |
| #NODE INFORMATION | | | | | |
| #NODE NUMBER | EFFECTIVE HYDRAULIC HEAD (m) | TYPE | INSTALLATION HEIGHT (m) | | |
| 1 | 0 | 1 | 0 | | |
| 2 | 0 | 0 | 0 | | |
| 3 | 0 | 0 | 0 | | |
| 4 | 0 | 0 | 0 | | |
| 5 | 0 | 0 | 0 | | |
| 6 | 0 | 0 | 0 | | |
| 7 | 0 | 0 | 0 | | |
| 8 | 0 | 0 | 0 | | |
| 9 | 0 | −1 | 0 | | |
| #PIPE INFORMATION | | | | | |
| #PIPE NUMBER | STARTING POINT | ENDING POINT | DIAMETER (m) | LENGTH (m) | PIPE FRICTION COEFFICIENT (-) |
| 1 | 1 | 2 | 0.1 | 1 | 0.01 |
| 2 | 2 | 3 | 0.1 | 1 | 0.01 |
| 3 | 3 | 4 | 0.1 | 1 | 0.01 |
| 4 | 4 | 5 | 0.1 | 1 | 0.01 |
| 5 | 1 | 5 | 0.1 | 1 | 0.01 |
| 6 | 1 | 6 | 0.1 | 1 | 0.01 |
| 7 | 6 | 7 | 0.1 | 1 | 0.01 |
| 8 | 5 | 7 | 0.1 | 1 | 0.01 |
| 9 | 5 | 8 | 0.1 | 1 | 0.01 |
| 10 | 8 | 9 | 0.1 | 1 | 0.01 |
| 11 | 7 | 9 | 0.1 | 1 | 0.01 |
| #END OF DEFINITION | | | | | | ns
LEAKAGE SUPPRESSION APPARATUS, LEAKAGE SUPPRESSION SYSTEM, AND LEAKAGE SUPPRESSION PROGRAM

TECHNICAL FIELD

Embodiments of the present invention relate to a leakage suppression apparatus, a leakage suppression system, and a leakage suppression program.

BACKGROUND ART

A terminal pressure controller has been known, which determines the pressure of a pressure actuation point, based on a terminal pressure at the position of a terminal in a water distribution pipeline network supplying water and on a target value. In the related art, it has not been possible to sufficiently grasp the state of a water distribution pipeline network. For this reason, in the related art, in order to reliably supply water at points of demand of each home, it has been necessary to set the water pressure of the injected water relatively high, and there have been cases in which water leakage from the water distribution pipeline network increases.

PRIOR ART REFERENCE

Patent Reference

[Patent Reference 1]: Japanese Patent Application Publication No. 2001-280597

SUMMARY OF THE INVENTION

Problem to be Solved by the Invention

The problem to be solved by the present invention is to provide a leakage suppression apparatus, a leakage suppression system, and a leakage suppression program capable of suppressing water leakage from a water distribution pipeline network.

Means for Solving the Problem

A leakage suppression apparatus of an embodiment has an acquirer, a pressure estimator, an extractor, and a controller. The acquirer acquires information regarding the amount of water flowing into a water distribution pipeline network that includes a plurality of nodes and information regarding the amount of water flowing out of the nodes. The pressure estimator, based on the information acquired by the acquirer and model information that includes connection information of the nodes in the water distribution pipeline network, estimates the water pressure at at least one part of the nodes in the water distribution pipeline network. The extractor extracts a minimum water pressure value from a plurality of water pressures that include the water pressure estimated by the pressure estimator. The controller controls an adjustor to adjust at least one of a water pressure and a flow rate of water flowing into the water distribution pipeline network, based on the minimum water pressure value extracted by the extractor.

BRIEF DESCRIPTION OF THE DRAWINGS

FIG. 3 shows an example of information stored as water distribution pipeline network model information 38.

EMBODIMENTS

Embodiments of a leakage suppression apparatus, a leakage suppression system, and a leakage suppression program are described below, with references made to the drawings.

First Embodiment

Figure 1:
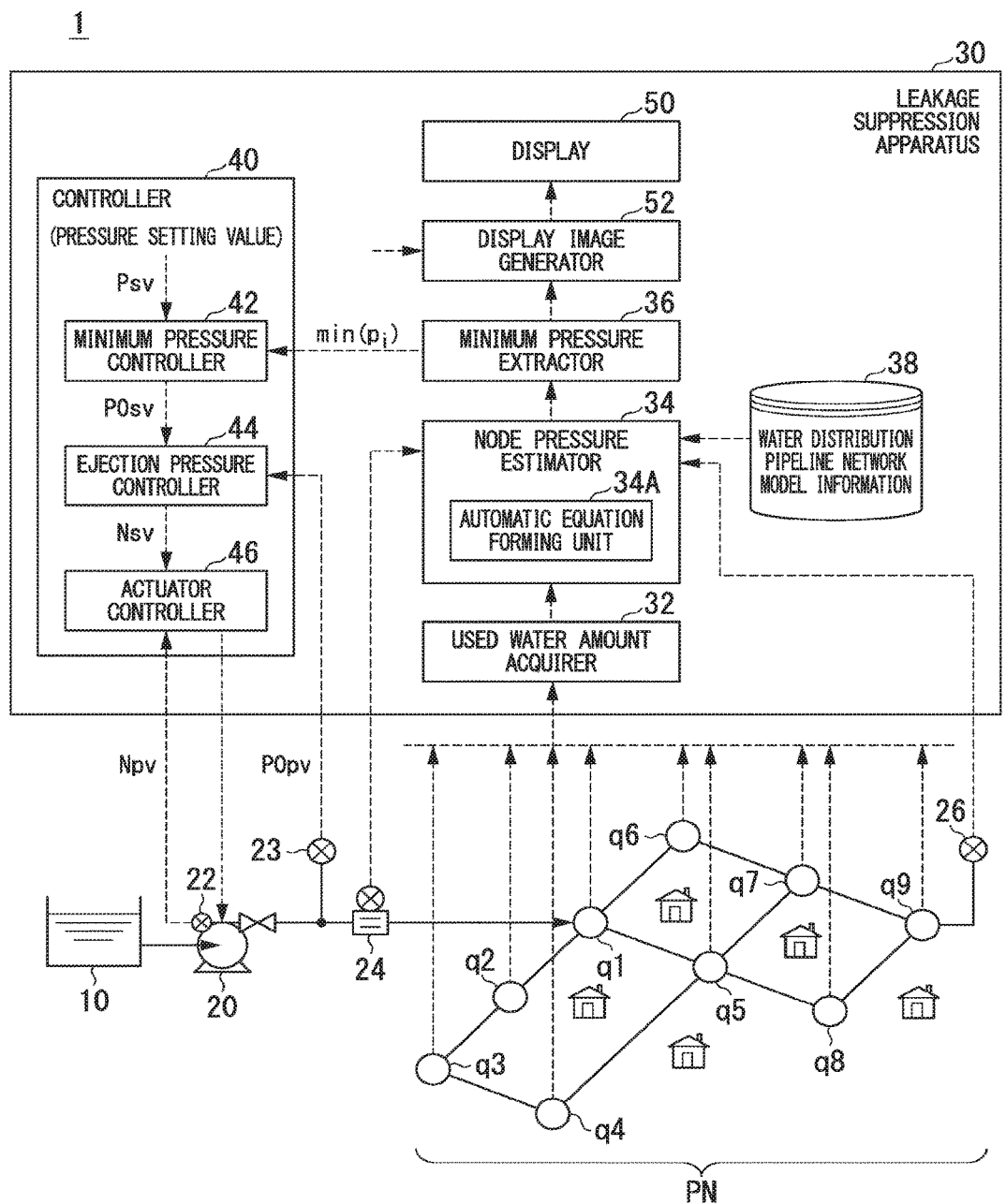
FIG. 1 shows an example of the constitution of a leakage suppression system 1 that includes a leakage suppression apparatus 30 according to a first embodiment.

FIG. 1 shows an example of the constitution of a leakage suppression system 1 that includes the leakage suppression apparatus 30 according to the first embodiment. The leakage suppression system 1 supplies water (purified water) stored in a water distribution reservoir 10 to homes, businesses, and the like by a pump 20. The pump 20 has mounted thereto an rotational rate sensor 22. The rotational rate sensor 22 outputs Npv, which is the rotational rate of the pump 20, to the leakage suppression apparatus 30. An ejection pressure sensor 23 detects the pressure of the water that is pressure-fed by the pump 20. The ejection pressure sensor 23 outputs the ejection pressure P0$pv$ to the leakage suppression apparatus 30. A flow rate sensor 24 detects the flow rate of the water flowing out from the pump 20. The flow rate sensor 24 outputs the flow rate of the water to the leakage suppression apparatus 30.

Nodes q1, q2, . . . qn (in the drawings, n=9) are established in the water distribution pipeline network PN that provides water from the pump 20 to home, offices, or factories. At least a part of the home, offices, or factories that is supplied water from the nodes has mounted thereto a smart meter to detect the amount of water used. The smart meter, for example, transmits to the leakage suppression apparatus 30 the amount of water used, with a frequency of, for example, one time each minute or one time each hour. The information of the amount of water used is collected in the leakage suppression apparatus 30, for example, as information for each node and is treated as the amount of water flowing out from each node. Rather than having an arrangement in which information of the amount of water used is collected in the leakage suppression apparatus 30 as information for each node, a device that measures or collects the amount of water used by home, offices, or factories may be provided at each node. A constitution for acquiring information regarding the amount of water flowing out of a node preferably collects and provides the leakage suppression apparatus 30 with information regarding the amount of water flowing from a node at least a plurality of times each day. An arrangement for collecting information regarding the amount of water flowing out from a node is not restricted to a device that measures and automatically transmits to the leakage suppression apparatus 30 the amount of water used, and an arrangement may be used wherein, by a person reading a detected value from a reading meter and inputting it into a device, it is transmitted to the leakage suppression apparatus 30 from that device.

Figure 2:
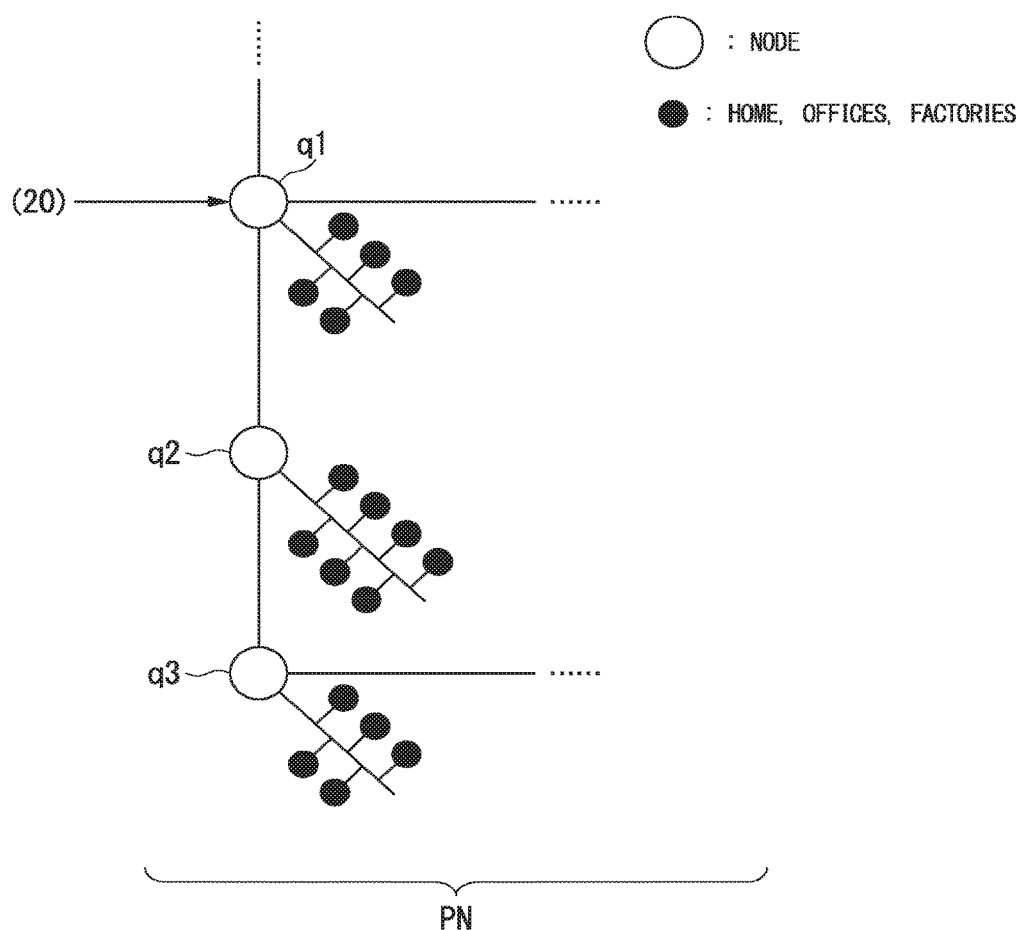
FIG. 2 shows an example of the relationship between homes, businesses or the like and nodes.

FIG. 2 shows an example of the relationship between nodes, and home, offices, or factories. In the drawing, the black circles represent home, offices, or factories. It is preferable that a pressure sensor 26 be mounted to a desired position in the water distribution pipeline network PN. In the present embodiment, the pressure sensor 26 may be omitted.

The leakage suppression apparatus 30 has a processor such as a CPU (central processing unit), a storage device such as a ROM (read-only memory), a RAM (random-access memory), a flash memory, or a HDD (hard disk drive) and various types of communication apparatus (such as network cards). The leakage suppression apparatus 30 has a used water amount acquirer 32, a node pressure estimator 34, a minimum pressure extractor 36, and a controller 40. The node pressure estimator 34 has an automatic equation forming unit 34A. The controller 40 further has a minimum pressure controller 42, an ejection pressure controller 44, and an actuator controller 46. The leakage suppression apparatus 30 may have a display 50, such as an LCD (liquid crystal display) or an organic EL (electroluminescence) display device, and a display image generator 52. These functional units (with the exception of the display 50) are, for example, functional software units that function by a CPU executing a program that is stored in a storage device. The program may be stored in a storage device (non-volatile storage medium) of the leakage suppression apparatus 30 beforehand, may be acquired from another computer via a network such as the Internet, or may be installed into a driving apparatus of the leakage suppression apparatus 30 by the insertion of a removable storage medium (non-volatile storage medium) in which the program is stored. A part or all of these functions may be a functional hardware unit such as an LSI (large-scale integrated) device or an ASIC (application-specific integrated circuit). The leakage suppression apparatus 30 stores water distribution pipeline network model information 38 in a storage device.

FIG. 3 shows an example of the information stored as the water distribution model information 38. As shown in the drawing, in the water distribution pipeline network model information 38 is coded, in addition to the number of nodes and number of pipes, information of the effective hydraulic head (m), type, and installation height (m) for each node, in association with the node numbers. In this case, a type "1" indicates a node into which water flows from the pump 20, and a type "−1" indicates a terminal node at which is mounted a pressure sensor 26. In the water distribution pipeline network model information 38, information of the node numbers of the starting point and the ending point, the length, and the pipe coefficient of friction are coded for each pipe, in association with the pipe numbers.

The used water amount acquirer 32, as described above, collects the amount of water used received from the smart meters mounted at each home and business or the like, and acquires the amount of water used for each node (that is, the amount of water flowing out of the nodes).

The node pressure estimator 34 estimates the pressure (water pressure) at each node, based on the flow rate input from the flow rate sensor 24, the amount of water used at each node, the pressure input from the pressure sensor 26, and the water distribution pipeline network model information 38. Hereinafter, the pressure of the water will be noted as the water pressure as required. The node pressure estimator 34 estimates the pressures p1, p2, . . . pn at each node by solving the ordinary differential Equation (1) and the mass balance Equation (2). In Equation (1), i and j are the numbers of nodes, $v_{ij}$ is the velocity of flow of water in the pipe ij (which connects node i and node j), $L_{ij}$ is the length (m) of the pipe ij, p is the density of water (kg/m$^3$), $H_i$ is the height of the node i, $D_{ij}$ is the diameter (m) of the pipe ij, and $\lambda_{ij}$ is the pipe coefficient of friction of the pipe ij. In Equation (2), A is the connection matrix shown in Equation (3), S is the pipe surface area matrix shown in Equation (4), V is the transposed vector [vij]T that is the velocity vector vij arranged in pipe number sequence, f is the inflow rate vector indicated in Equation (5), and Q is the vectorization of the amount of water used by each node. In the connection matrix A, a matrix element of "1" indicates that, of the nodes at each end of the pipe indicated by that pipe number, the indicated node is on the upstream side regarding the flow of water, and an element of "−1" indicates that the node is on the downstream side. The $S_{ij}$ in the pipe surface area matrix is the surface area $((\pi/4) \cdot D_{ij}^2)$ of the pipe ij indicated by the lateral position. The value $\alpha$ in the inflow rate vector f is the flow rate input from the flow rate sensor 24.

$$\frac{dv_{ij}(t)}{dt} = \frac{1}{\rho L_{ij}} \{p_i(t) - p_j(t)\} + \frac{g}{L_{ij}} (H_i - H_j) - \frac{\lambda_{ij}}{2D_{ij}} v_{ij}(t)|v_{ij}(t)| \quad (1)$$

$$ASV \cdot f - Q = 0 \quad (2)$$

$$A = \begin{bmatrix} 1 & 0 & 0 & 0 & 1 & 1 & 0 & 0 & 0 & 0 & 0 \\ -1 & 1 & 0 & 0 & 0 & 0 & 0 & 0 & 0 & 0 & 0 \\ 0 & -1 & 1 & 0 & 0 & 0 & 0 & 0 & 0 & 0 & 0 \\ 0 & 0 & -1 & 1 & 0 & 0 & 0 & 0 & 0 & 0 & 0 \\ 0 & 0 & 0 & -1 & -1 & 0 & 0 & 1 & 1 & 0 & 0 \\ 0 & 0 & 0 & 0 & 0 & -1 & 1 & 0 & 0 & 0 & 0 \\ 0 & 0 & 0 & 0 & 0 & 0 & -1 & -1 & 0 & 0 & 1 \\ 0 & 0 & 0 & 0 & 0 & 0 & 0 & 0 & -1 & 1 & 0 \\ 0 & 0 & 0 & 0 & 0 & 0 & 0 & 0 & 0 & -1 & -1 \end{bmatrix} \begin{matrix} \text{PIPE NUMBER} \rightarrow \\ \\ \text{NODE NUMBER} \downarrow \end{matrix} \quad (3)$$

$$S = \begin{bmatrix} s_{ij} & 0 & 0 & & \\ 0 & s_{ij} & 0 & & \\ 0 & 0 & s_{ij} & & \\ & & & \ddots & \\ & & & & s_{ij} \end{bmatrix} \quad (4)$$

$$f = \begin{bmatrix} \alpha \\ 0 \\ 0 \\ \vdots \\ 0 \end{bmatrix} \quad (5)$$

When new water distribution pipeline network model information 38 is stored in the storage device or the water distribution pipeline network model information 38 is updated, the automatic equation forming unit 34A of the node pressure estimator 34 generates software that includes an ordinary differential Equation (1) of an order reflecting the connectivity relationship in the water distribution pipeline network model information 38 and the number of pipes and the like, and the mass balance Equation (2). In this case, the node pressure estimator 34 inputs as parameters to the software generated by the automatic equation forming unit 34A the flow rate input from the flow rate sensor 24, the amount water used at each node, and the pressure input from the pressure sensor 26, to execute processing to solve Equation (1) and Equation (2), and to estimate the pressure (water pressure) at each node. After the automatic equation forming unit 34A generates software that includes Equation (1) and Equation (2) regarding the water distribution pipeline network, the pressure (water pressure) at each node can be estimated by only inputting the above-noted parameters. If the leakage suppression apparatus 30 is customized for a specific water distribution pipeline network, software that includes Equation (1) and Equation (2) corresponding to the water distribution pipeline network may be provided from the start, and the generation of the software by the automatic equation forming unit 34A may be omitted, as may the automatic equation forming unit 34A itself.

The minimum pressure extractor 36 extracts the minimum value min(pi) from the pressures pi (where i=1 to n) estimated by the node pressure estimator 34 and outputs it to the controller 40. In this case, the minimum pressure extractor 36, rather than extracting the exact minimum value, may perform processing to discard abnormal values and extract the substantially minimum value.

The minimum pressure controller 42 of the controller 40, based on the minimum value min(pi) input from the minimum pressure extractor 36 and a pressure setting value Psv set beforehand, computes the appropriate outflow pressure target value P0sv from the pump 20. The pressure setting value Psv is determined beforehand, for example, by adding to the water pressure limit for achieving sufficient output water force at a spigot in a home or business or the like (for example, 200 kPa) a value that anticipates the amount of reduction in pressure between the node and the home and business or the like, by the structure shown by example in FIG. 2. The pressure setting value Psv is, for example, approximately 15 m as the effective hydraulic head. By performing control so that the water pressure pi at all the nodes is at least the pressure setting value Psv, sufficient water can be provided to home, offices, or factories using the water distribution pipeline network PN. The minimum pressure controller 42 may control the flow rate of water flowing into the water distribution pipeline network PN, rather than the water pressure of water flowing into the water distribution pipeline network PN, so as to perform control so that the minimum value min(pi) does not fall below the pressure setting value Psv set beforehand.

The ejection pressure controller 44, based on the ejection pressure target value P0sv set by the minimum pressure controller 42 and the ejection pressure P0pv input from the ejection pressure sensor 23, performs feedback computation by PID or the like to determine the target rotational rate Nsv of the pump 20. A constitution may be adopted wherein the ejection pressure target value P0sv computed by the minimum pressure controller 42, rather than being output automatically to the ejection pressure controller 44, is displayed on the display 50 or the like, and a human inputs the ejection pressure target value P0sv to the ejection pressure controller 44 in accordance with the displayed content. In this case, the ejection pressure target value P0sv may be discrete values or discrete data (for example high-medium-low or A-B-C), rather than continuous values. It is not necessary that the timing of computing the ejection pressure target value P0sv be made to coincide with the information acquisition period or the pump control period, and this may be each fixed interval (for example each one hour). The actuator controller 46 performs control to control the power to the pump 20 and control an actuator that opens and closes a valve that is accompanies the pump 20 (or is independent thereof), so that the rotational rate Npv of the pump 20 input from the rotational rate sensor 22 coincides with the target rotational rate Nsv.

(Comparison with Related Art)

As known related art, the water pressure at a fixed point (terminal) that is assumed to have the lowest water pressure within a water distribution pipeline network is measured, and control is performed so that the terminal water pressure is at least the pressure setting value. The terminal can be remote from the intake of the water distribution pipeline network, or can be a fixed point that, because of its great height, is assumed to have a low water pressure. However, this "terminal" does not necessarily have the minimum water pressure. In an actual water distribution pipeline network, because of, for example, non-uniformity of water demand, the point having the lowest water pressure might vary with the elapse of time. For this reason, if control is done so that the water pressure at the fixed point is at least the pressure setting value, if you consider that there could be a point having a lower water pressure, there are cases in which the pressure setting value inevitably is set high. When the pressure setting value is set high, because the water pressure in the overall water distribution pipeline network rises, the amount of water leakage into the soil increases.

It has been experimentally verified that, in general, the relationship between the pressure within a water distribution block and the amount of leakage is as shown by Equation (6), which L is the amount of leakage (liters/s) at a node i, and C is the leakage coefficient. The water leakage coefficient is dependent on the extended pipe length and diameter, and on the shape and surface area of the leakage hole, regarding the node i. In the equation, h is the effective hydraulic head (m) of the node i, and κ is an empirical multiplier (for example, 1.15). As can be understood from Equation (6), by making the water pressure at each node (the effective hydraulic head) as small as possible, the effect of suppressing water leakage is obtained.

$$L = c \cdot h^{\kappa} \quad (6)$$

Figure 4:
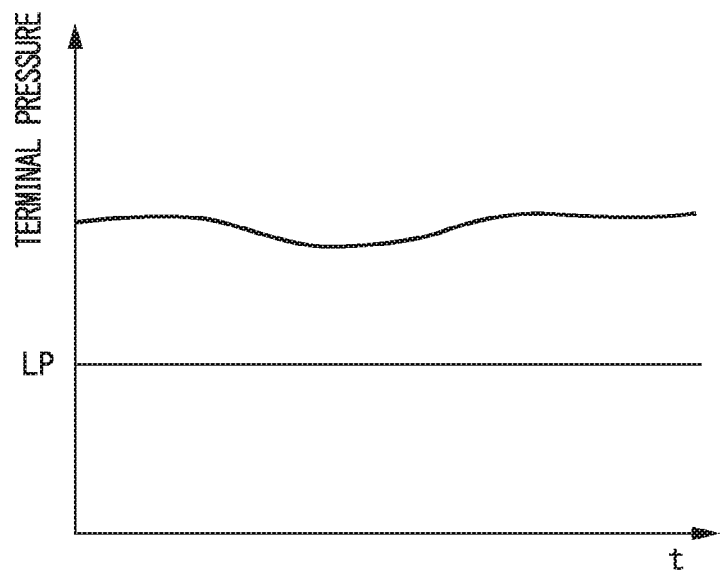
FIG. 4 shows by an exemplary image the time variation of the terminal water pressure when the pressure setting value is set by the related art.
Figure 5:
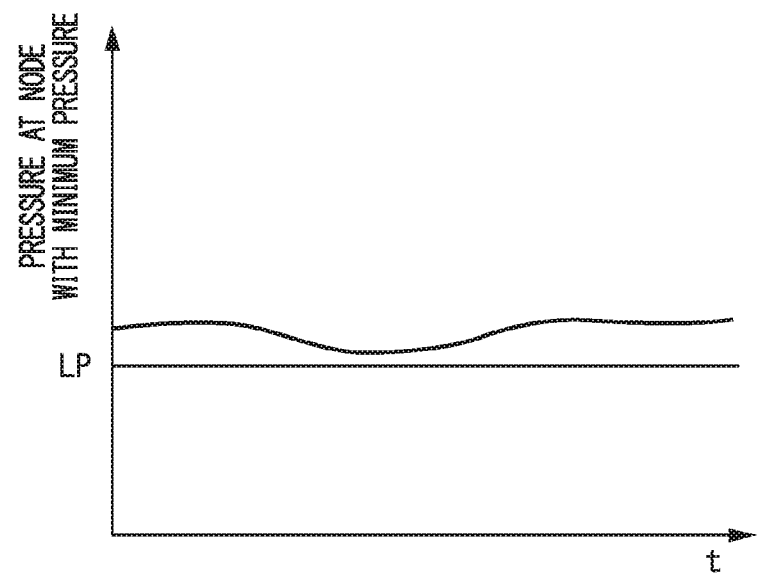
FIG. 5 shows by an exemplary image the time variation of the water pressure at the location at which the water pressure is minimum when the pressure setting value is set by the present embodiment.

In the leakage suppression apparatus 30 of the present embodiment, because the water pressure at each node is estimated by the above-described method and control is performed so that the minimum value of the estimated pressure is at least the pressure setting value, compared with the above-noted related art, a margin is imparted to the pressure setting value, and the need to set it high is reduced. As a result, the leakage suppression apparatus 30 can make the pressure setting value relatively low. For this reason, the leakage suppression apparatus 30 can suppress the water pressure in the overall water distribution pipeline network PN, and reduce the amount of water leakage into the soil. FIG. 4 shows by an exemplary image the time variation of the terminal water pressure when the pressure setting value is set by the related art, and FIG. 5 shows by an exemplary image the time variation of the water pressure at the location at which the water pressure is minimum when the pressure setting value is set by the present embodiment. In these drawings, LP is the lower limit of water pressure. In FIG. 5, the point at which the water pressure is the lowest is not a fixed point but changes dynamically. As shown in the drawings, because the leakage suppression apparatus 30 of the present embodiment performs control with the node estimated to have the lowest water pressure as a reference, it can lower the water pressure in the overall water distribution pipeline network PN and suppress water leakage into the soil.

(Display Image)

Figure 6:
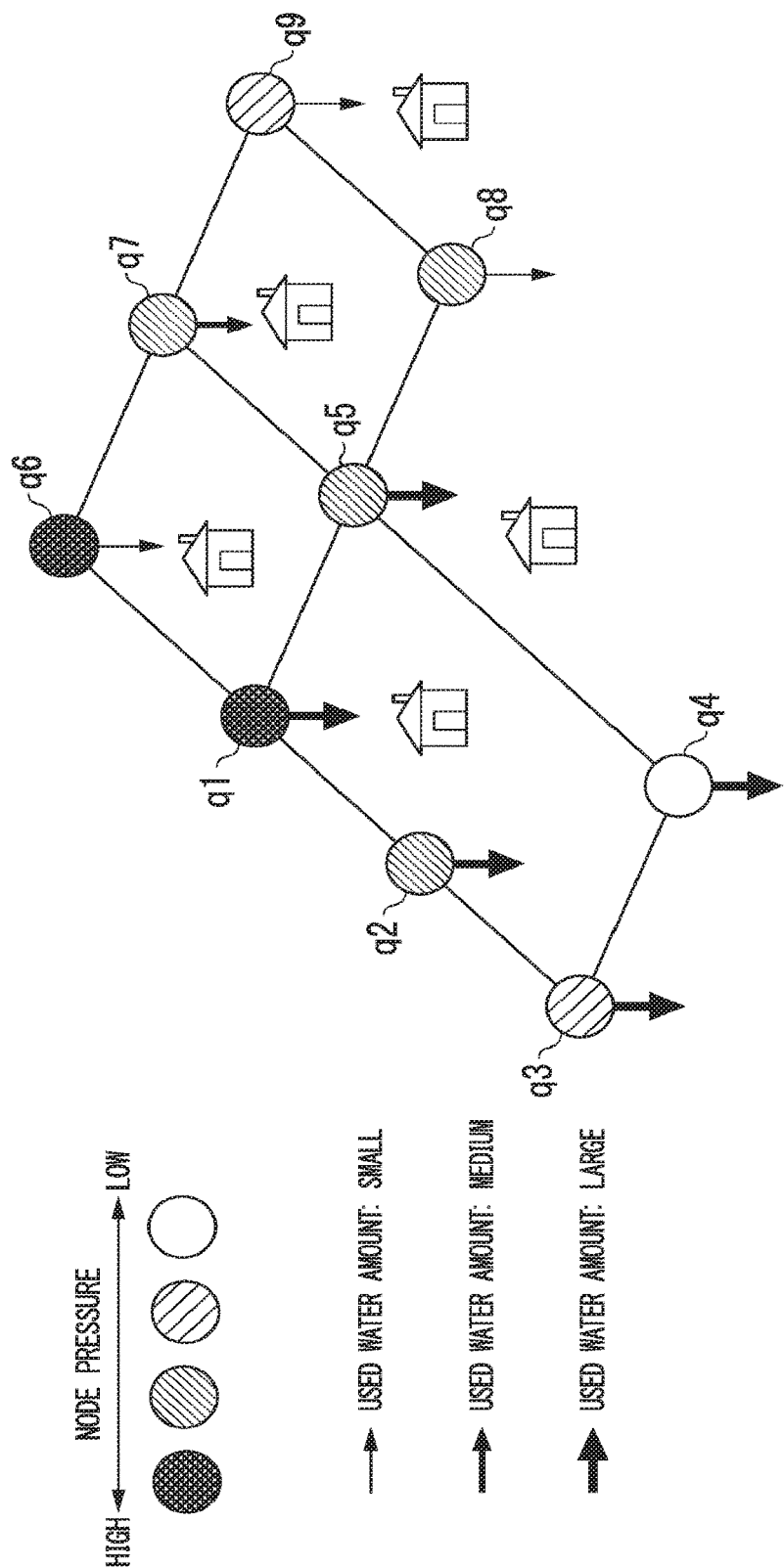
FIG. 6 shows an example of a water distribution state display image generated by a display image generator 52.

Various types of information which is referenced within the leakage suppression apparatus 30 are input to the display image generator 52. The display image generator 52, for example, generates a display image enabling a comparison between the amount of water used and the estimated pressure at each node, and causes the display thereof on the display. FIG. 6 shows an example of a water distribution state display image generated by the display image generator 52. In the water distribution state display image, the amount of water used and the estimated pressure at every node are displayed overlapped on a simplified map of the water distribution pipeline network PN. By displaying an image such as this, it is possible to quickly grasp the relationship between the amount of water used and the pressure in the water distribution pipeline network PN.

Figure 7:
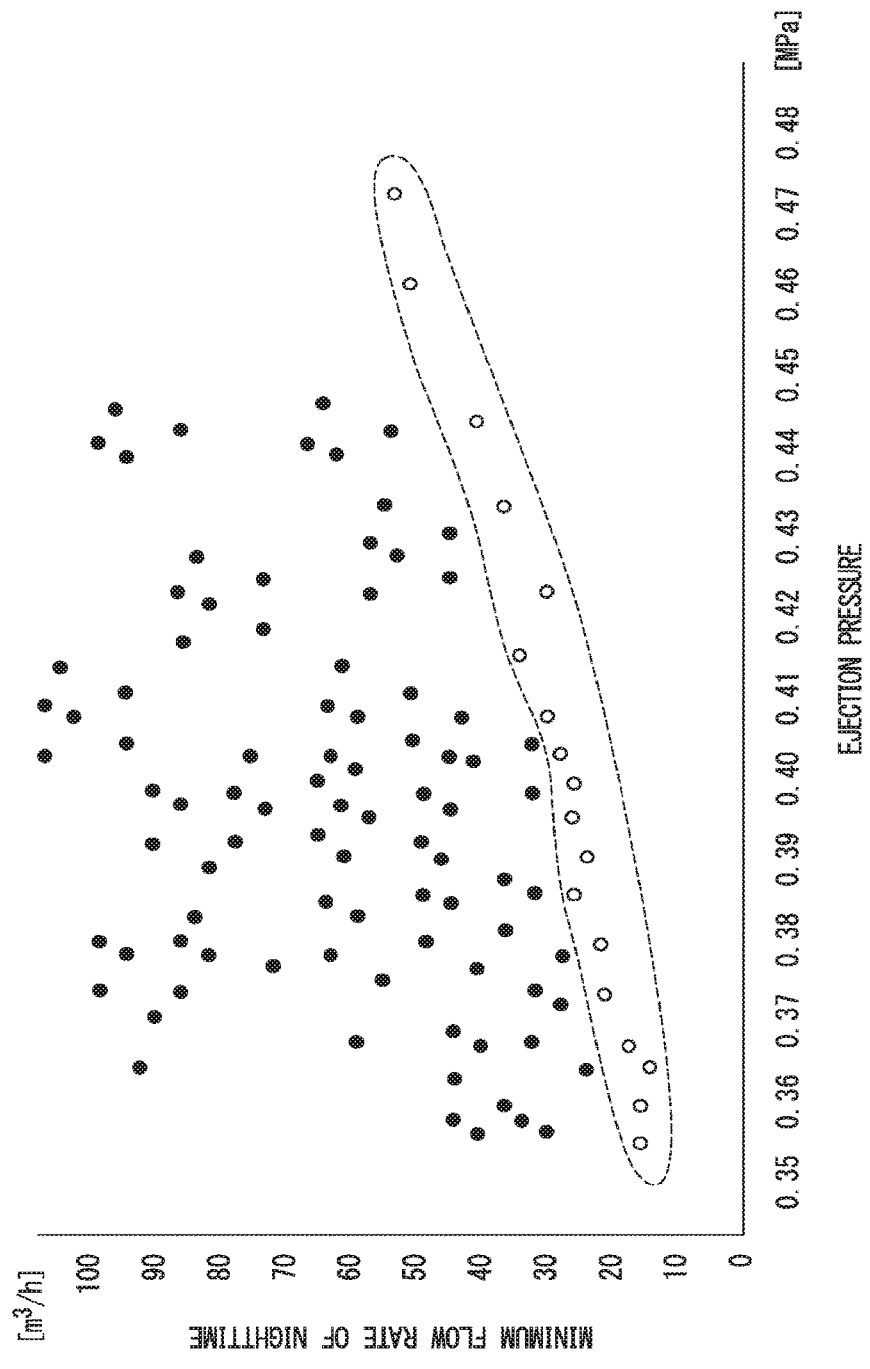
FIG. 7 shows an example of the relationship between the pump ejection pressure and the minimum flow rate detected at night (minimum nighttime flow rate).

The display image generator 52 may display on the display 50 a visualization of the leakage suppression effect. For example, the display image generator 52 may output to the display 50 a graph that plots on the horizontal axis the ejection pressure of the pump 20 and on the vertical axis the minimum value for each ejection pressure value of the nighttime minimum flow rate. The flow rate can be monitored using, for example, the detection value of the flow rate sensor 24. FIG. 7 shows an example of the relationship between the pump ejection pressure and the minimum flow rate detected at night (minimum flow rate of nighttime). In this manner, the minimum nighttime flow rate can indicate a different flow rate even for the same ejection pressure. This variation is thought to be caused by variation in the actual amount of water used. In order to visualize the water leakage suppression effect, therefore, it is effective to extract from the minimum flow rates of nighttime and display the minimum values for each of the ejection pressures. The data surrounded by the broken line in FIG. 7 correspond to the minimum values for each ejection pressure extracted from the minimum flow rates of nighttime. Such images for each of the states of before and after applying the leakage suppression apparatus 30, are displayed to grasp the effectiveness in suppressing water leakage by the leakage suppression apparatus 30.

According to the leakage suppression apparatus 30 according to the present embodiment described above and the leakage suppression system that makes use thereof, because information regarding the amount of water used flowing into the water distribution pipeline network PN (the flow rate detected by the flow rate detector 24) and information regarding the water flowing out from a node in the water distribution pipeline network PN (amount of water used acquired by the used water amount acquirer 32) are acquired and, based on that information and the water distribution pipeline network model information 38 that including the node connection information, the node water pressures in the water distribution pipeline network PN are estimated (the node at which the pressure sensor 26 is mounted need not be estimated), and an adjustor (pump 20) to adjust at least one of a water pressure and a flow rate of water flowing into the water distribution pipeline network PN based on the minimum value of the estimated values is controlled, leakage of water from the water distribution pipeline network PN can be suppressed.

Second Embodiment

Figure 8:
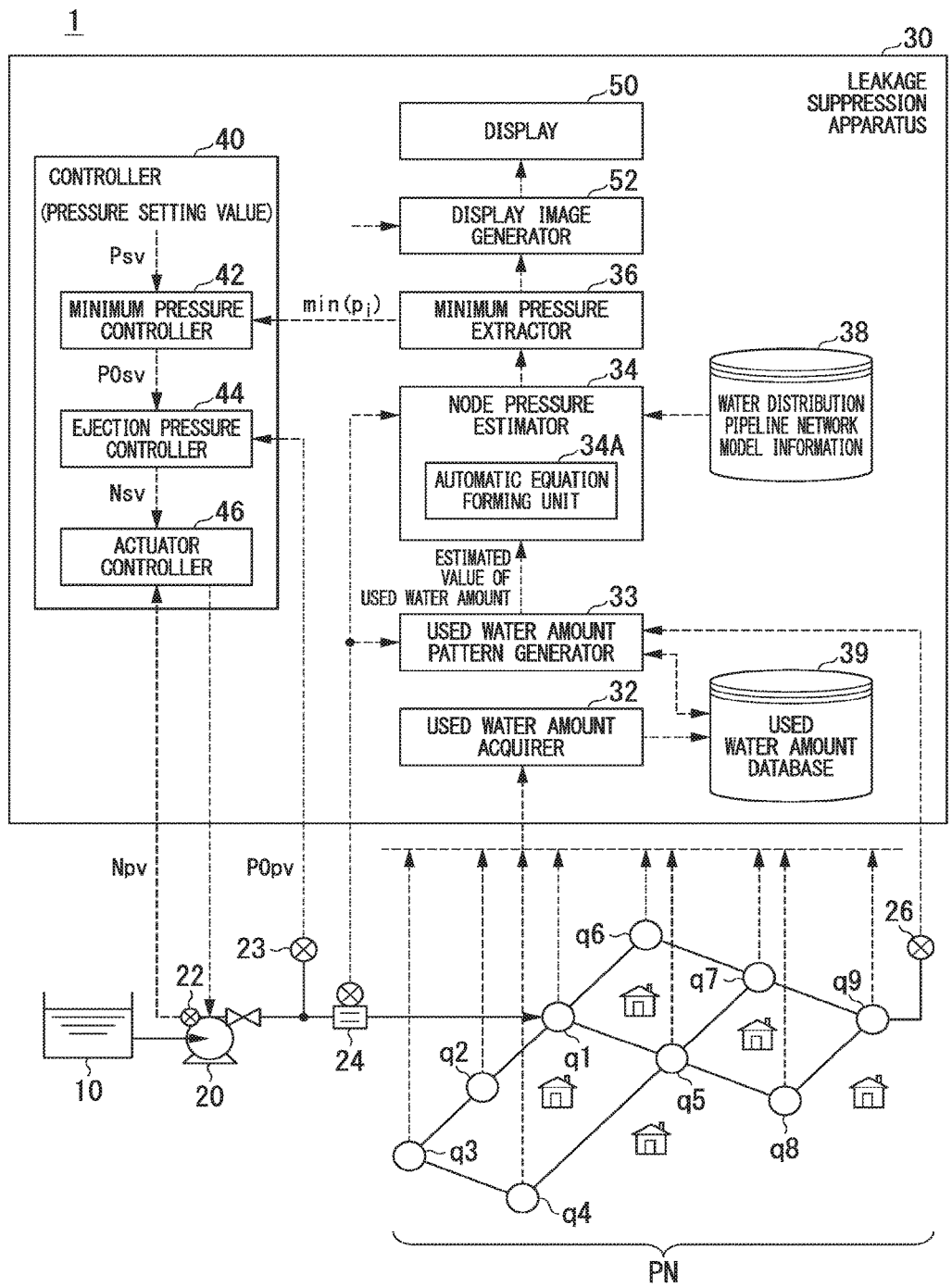
FIG. 8 shows an example of the constitution of a leakage suppression system 1 that includes a leakage suppression apparatus 30 according to a second embodiment.

FIG. 8 shows an example of the constitution of a leakage suppression system 1 that includes a leakage suppression apparatus 30 according to the second embodiment. The leakage suppression apparatus 30 according to the second embodiment, in addition to the constitution of the first embodiment, has a used water amount pattern generator 33 and a used water amount database 39. Although in the leakage suppression apparatus 30 of the second embodiment a smart meter mounted in a home and a business or the like performs measurement at the same interval as in the first embodiment (for example one time each minute or one time each hour), it can accommodate a transmission of information at a frequency that is lower than that of measurement (for example, one time each day).

The used water amount acquirer 32 writes the amount of water used at each node, for example, for each day of the week, or each time period of the day into the used water amount database 39. The used water amount pattern generator 33 builds a correlation model by, for example, storing the flow rate detected by the flow rate sensor 24, the water pressure detected by the pressure sensor 26, and the used water amount into the used water amount database 39, associated with the amount of water used. Then, the used water amount pattern generator 33, by inputting the flow rate detected by the flow rate sensor 24 and the water pressure detected by the pressure sensor 26 to the correlation model as parameters, estimates and outputs to the node pressure estimator 34 the amount of water used at each node at that point in time.

The correlation model may be a multiple regression model that takes a time as an explanatory variable, an ARMA (auto-regressive moving average) model, or an ARIMA (auto-regressive integrated moving average) model. The used water amount pattern generator 33 may estimate the amount of water used at each node at that point in time by a simple method such as multiplying the normalized pattern of the same amount of water used of the previous day by the current intake flow mount. Because the subsequent processing is the same as in the first embodiment, the description thereof will be omitted.

The leakage suppression apparatus 30 described above and the leakage suppression system that makes use thereof can suppress the leakage of water from the water distribution pipeline network PN in the same manner as the first embodiment. Also, in contrast to the first embodiment, it can accommodate even if the frequency of acquiring the amount of water used at each node is low.

In accordance with at least one of the above-described embodiments, the leakage suppression apparatus acquires information regarding the amount of water flowing into a water distribution pipeline network and information regarding the amount of water flowing out from a node in the water distribution pipeline network and, based on that information and on information regarding a water distribution pipeline network model that includes connection information of the nodes, estimates the water pressure at a node in the water distribution pipeline network and, based on the minimum value of the estimated values, controls an adjustor to adjust at least one of a water pressure and a flow rate of the water flowing into the water distribution pipeline network thereby suppressing the leakage of water from the water distribution pipeline network.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 9:
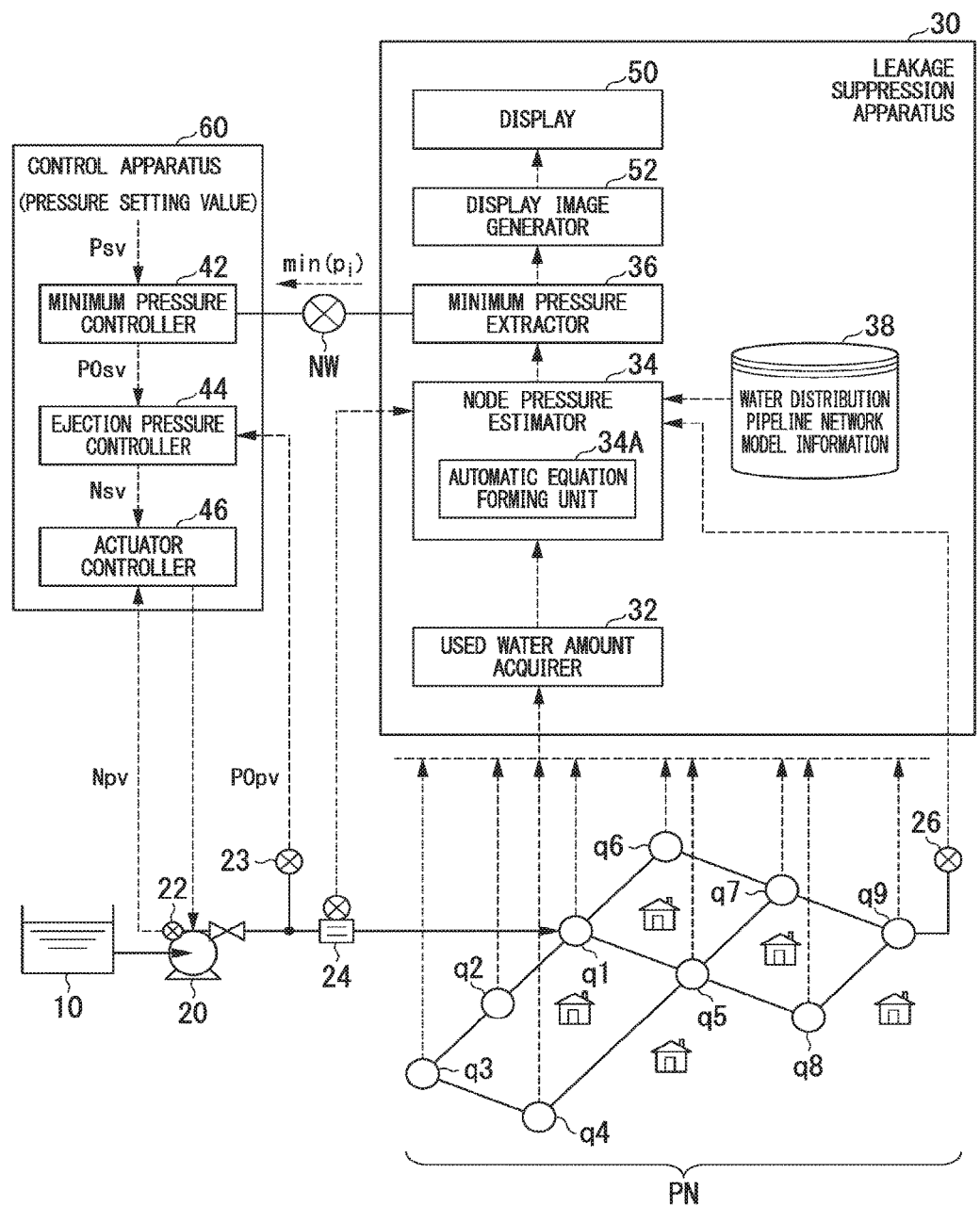
FIG. 9 shows an example of a system constitution in which leakage suppression apparatus 30 and the control apparatus 60 corresponding to the controller 40 are separate units.
Figure 10:
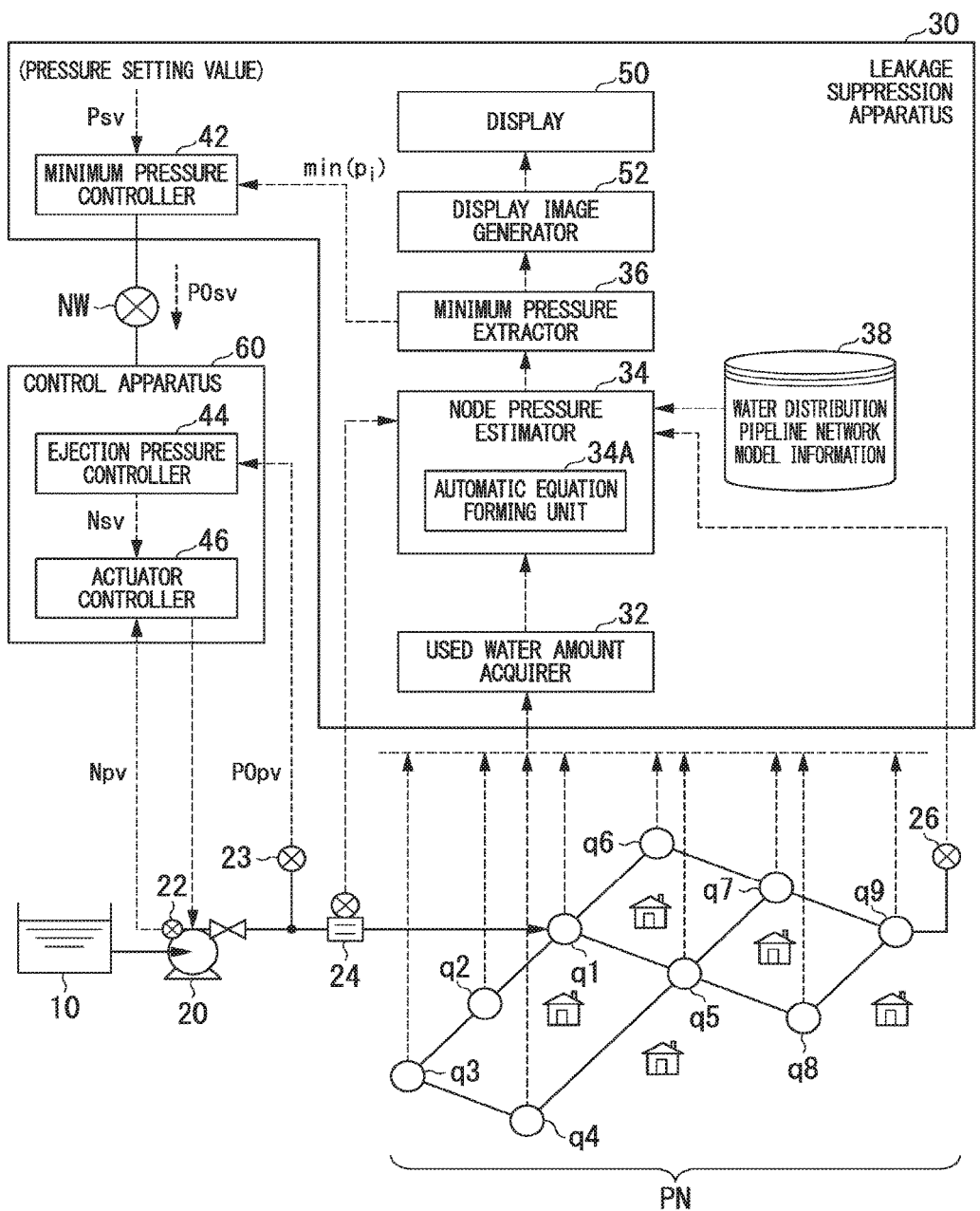
FIG. 10 shows an example of a system constitution in which leakage suppression apparatus 30 and the control apparatus 60 corresponding to the controller 40 are separate units.

For example, although the above-noted leakage suppression apparatus 30 includes the controller 40, it may be constituted to have the controller 40 as a separate unit and to transmit the minimum pressure min(pi) and a control target value such as of the ejection pressure P0$pv$ and the like to a device corresponding to the controller 40. FIG. 9 and FIG. 10 show examples of system constitutions in which the leakage suppression apparatus 30 and a control apparatus 60 corresponding to the controller 40 are separated. In these drawings, the elements to which numbers the same as in the above-described embodiments are applied have the same functions as in the above-noted embodiments. As shown in FIG. 9, the leakage suppression apparatus 30 may transmit the minimum pressure min(pi), via a network NW such as the Internet, to the control apparatus 60 and, as shown in FIG. 10, the leakage suppression apparatus 30 may transmit the ejection pressure P0$pv$, via a network NW such as the Internet, to the control apparatus 60. Similar to the above-noted embodiments, the minimum pressure min(pi) or ejection pressure P0$pv$, rather than being continuous values, may be discrete values or discrete data (for example high-medium-low or A-B-C). Also, the constitution shown in FIG. 9 or FIG. 10 may be provided with a used water amount pattern generator 33 or a used water amount database, as in the above-noted second embodiment. The minimum pressure min(pi) or ejection pressure P0$pv$ received from the leakage suppression apparatus 30, rather than being automatically input to the functional units of the control apparatus 60, may be displayed on a display device at the control apparatus 60 side and a control target may be input to the control apparatus 60 by a human.

In the above-noted embodiments, the interface part into which the values detected by the flow rate sensor 24 and the pressure sensor 26 are input into the leakage suppression apparatus 30 and the used water amount acquirer 32 are examples of an "acquirer", the node pressure estimator 34 is an example of a "pressure estimator," the minimum pressure extractor 36 is an example of an "extractor," and the used water amount pattern generator 33 is an example of a "used water amount estimator." The ejection pressure target value P0$sv$ is an example of a "control target value."

The invention claimed is:

1. A leakage suppression apparatus comprising:
    an acquirer that acquires information regarding an amount of water flowing into a water distribution pipeline network having a plurality of nodes and information regarding an amount of water flowing out from the nodes;
    a pressure estimator that estimates the water pressure at at least a part of the nodes in the water distribution pipeline network, based on information acquired by the acquirer and on model information that includes connection information of the nodes in the water distribution pipeline network;
    an extractor that extracts a minimum water pressure value from a plurality of water pressures that include the water pressure estimated by the pressure estimator; and
    a controller that controls an adjustor to adjust at least one of a water pressure and a flow rate of water flowing into the water distribution pipeline network, based on the minimum value extracted by the extractor.

2. A leakage suppression apparatus comprising:
    an acquirer that acquires information regarding an amount of water flowing into a water distribution pipeline network having a plurality of nodes and information regarding an amount of water flowing out from the nodes;
    a water amount estimator that estimates the amount of water flowing out at present from the node, based on information regarding the amount of water flowing out from the node acquired in the past by the acquirer;
    a pressure estimator that estimates the water pressure at at least a part of the nodes in the water distribution pipeline network, based on information acquired by the acquirer, the amount of water estimated by the water amount estimator, and model information that includes connection information of the nodes in the water distribution pipeline network;
    an extractor that extracts a minimum water pressure value from a plurality of water pressures that include the water pressure estimated by the pressure estimator; and
    a controller that controls an adjustor to adjust at least one of a water pressure and a flow rate of water flowing into the water distribution pipeline network, based on the minimum water pressure value extracted by the extractor.

3. The leakage suppression apparatus according to claim 2,
    wherein, the acquirer further acquires a water pressure at a node in the water distribution pipeline network.

4. The leakage suppression apparatus according to claim 2,
    wherein, the pressure estimator estimates the water pressure at at least a part of the nodes in the water distribution pipeline network by solving simultaneous equations which includes;
    an equation indicating the relationship between a difference in pressure between nodes and a flow rate between nodes, and
    a mass balance equation.

5. The leakage suppression apparatus according to claim 1,
wherein, the acquirer further acquires a water pressure at a node in the water distribution pipeline network.

6. The leakage suppression apparatus according to claim 1,
wherein, the pressure estimator estimates the water pressure at at least a part of the nodes in the water distribution pipeline network by solving simultaneous equations which includes;
an equation indicating the relationship between a difference in pressure between nodes and a flow rate between nodes, and
a mass balance equation.

7. The leakage suppression apparatus according to claim 6,
wherein, the pressure estimator generates software that includes the simultaneous equations which includes the equation indicating the relationship between a difference in pressure between nodes and a flow rate between nodes, and
the mass balance equation, based on the model information, and inputs information acquired by the acquirer into the generated software, to solve the simultaneous equations which includes the equation indicating the relationship between a difference in pressure between nodes and a flow rate between nodes, and the mass balance equation, and to estimate the water pressure at the at least part of the nodes in the water distribution pipeline network.

\* \* \* \* \*